United States Patent [19]
Johnson et al.

[11] 3,826,295
[45] July 30, 1974

[54] FELLING HEAD STRUCTURE

[75] Inventors: Earl C. Johnson, Bellevue; Stanley Robert Hiseler, Dubuque, both of Iowa

[73] Assignee: Deere & Company, Moline, Ill.

[22] Filed: Apr. 26, 1973

[21] Appl. No.: 354,480

[52] U.S. Cl. ................ 144/34 E, 144/2 Z, 144/3 D
[51] Int. Cl. ............................................. A01g 23/08
[58] Field of Search ........ 144/2 Z, 3 D, 34 R, 34 B, 144/34 E, 309 AC

[56] References Cited
UNITED STATES PATENTS
3,540,501  11/1970  Jonsson ............................ 144/34 E
3,572,411  3/1971  Coughran, Jr. ..................... 144/3 D

*Primary Examiner*—Andrew R. Juhasz
*Assistant Examiner*—W. D. Bray

[57] ABSTRACT

An articulated, four-wheel drive tree harvesting machine includes a front frame section upon which a felling boom assembly, a delimbing assembly and a feed assembly are mounted. The felling boom assembly is operable for severing a tree and lowering the same into a generally horizontal disposition from where the trunk of the tree may be released for engagement by feed rolls of the feed assembly and for encirclement by blades of the delimbing assembly. The felling boom assembly includes a felling head structure which is pivotally mounted at the end of a boom section for movement about a horizontal axis and which includes a pair of cylindrically curved blades mounted for vertical swinging movement about an axis arranged to extend crosswise to the longitudinal axis of a tree being sheared. A pair of double-acting pistons are mounted within a common cylinder and are respectively linked to the pair of blades for selectively moving the latter towards and away from each other. The felling head structure also includes a pair of grapple tongs located above the pair of blades and a double-acting cylinder is connected to each of the pair of grapple tongs and are operable independently of the blade-operating pistons. The pivotal connection between the felling head structure and the boom of the felling boom assembly forms a fluid manifold for conveying pressure and exhaust fluid to and from the hydraulic actuators for the blades and the grapple tongs.

18 Claims, 6 Drawing Figures

FELLING HEAD STRUCTURE

BACKGROUND OF THE INVENTION

The present invention relates to tree harvesting machines and more particularly relates to a felling head structure of the type which is pivotally mounted at the end of a felling boom for movement about a horizontal axis and which includes a pair of grapple tongs mounted above a pair of shear blades, the pair of tongs and the pair of shear blades being respectively operable for grasping and shearing a tree trunk positioned therebetween.

Tree harvesting is often conducted in forests under conditions which are adverse to the operation of the tree shear. Specifically, in many forested areas, there exists undergrowth in which the felling head structure must operate in order to shear a tree.

Heretofore, it has been common practice to provide felling head structures including one or more flat, plate-like blades mounted by an arrangement for disposing the blades for movement in a plane extending transversely to the length of a tree to be sheared. These blades and the means for mounting and actuating the same are located in the lowermost part of the felling head structure in order that the blades be disposed to shear a tree as closely to the ground as possible. Thus, when operating in undergrowth, the operation of the shear blades is often impaired due to twigs, branches and the like becoming lodged in areas which block the movement of the shear blade-operating linkages and due to the fact that the undergrowth comes into contact with the hydraulic hoses for conveying actuating fluid to actuators for swinging the blades, thus shortening the wear life of the hoses. When operating in snow, the operation of the known shear blades is often impaired due to the fact that snow will pack in areas whereat it blocks the movement of the blade-operating linkage and also due to the fact that the flat blades present a relatively large area to the snow which packs the snow and prevents the felling head structure from being lowered to a position for disposing the shear blade or blades so as to cut a tree as closely to the ground as possible.

Accordingly, it is a broad object of the invention to provide a tree harvesting machine having a felling head structure which overcomes the disadvantages, noted above, of existing felling head structures. Specifically, it is an object to provide a felling head structure having a pair of cylindrically curved shear blades which are mounted for vertical swinging movement about an axis that is disposed for intersecting the longitudinal axis of a standing tree positioned between the shear blades and to provide a felling head structure wherein an actuator and linkage for operating the blades are located centrally between the top and bottom of the felling head structure so as to be somewhat removed from any undergrowth present at a tree to be sheared.

A further object of this invention is to provide cylindrically curved blades, as before described, which are positioned together with their operating linkages so as to cleave the snow when the felling head structure is lowered to thus permit the blades to be actuated to shear a tree at a location adjacent the ground level. A related object is to provide such a shear blade and operating linkage arrangement which is constructed so as to shed and expell snow, mud and other debris during shearing operations.

Another object is to provide a felling head structure having a pivot connection for joining it to the end of a boom, the pivot connection defining a fluid manifold by which actuating fluid is conveyed to respective actuators for actuating the shear blades and a pair of grapple tongs located above the shear blades.

Still another object of this invention is to provide a single cylinder structure for a pair of double-acting pistons for operating the pair of shear blades.

These and other objects will become apparent from the following description and appended drawings.

SUMMARY OF THE INVENTION

According to the present invention, there is provided a shear head structure including a pair of vertically swingable, cylindrically curved shear blades located below a pair of horizontally swingable grapple tongs.

The shear head structure includes a main frame having a forward side adapted to be positioned against a tree to be sheared. Pivotally connected to the bottom of the frame for swinging about an axis extending generally perpendicular to the forward side of the frame is a pair of blade support arms respectively including a pair of tubular support members extending forwardly beyond the frame in general parallelism to the axis. The cylindrically curved blades are respectively connected to the pair of support members through means for pre-stressing the blades so as to minimize the loading thereon during the shearing operation and means for adjusting the blades so that they are properly overlapped when closed. The blade support arms and hence the blades are swung towards and away from each other through means including respective crank arms and drop links arranged so as to increase the cutting force applied to the blades as the latter approach the center of a tree. The crank arms are operated through means of a hydraulic actuator comprising a unitary cylinder in which is mounted a pair of double-acting pistons which are respectively secured to oppositely projecting piston rods having their ends connected to the crank arms.

A pair of grapple tongs are pivotally mounted on the frame of the felling head structure at a location spaced vertically above the shear blades and are respectively operated through means of a pair of double-acting hydraulic actuators. The actuators for operating the tongs are controllable independently of the actuator for controlling the shear blades.

The felling head structure is pivotally connected to the end of a boom section through means of a pivot structure defining a fluid manifold for routing pressure and exhaust fluid to and from respective hoses connected to the shear blade actuator and the pair of grapple tong actuators.

DESCRIPTION OF THE PREFERRED EMBODIMENT

Figure 1:
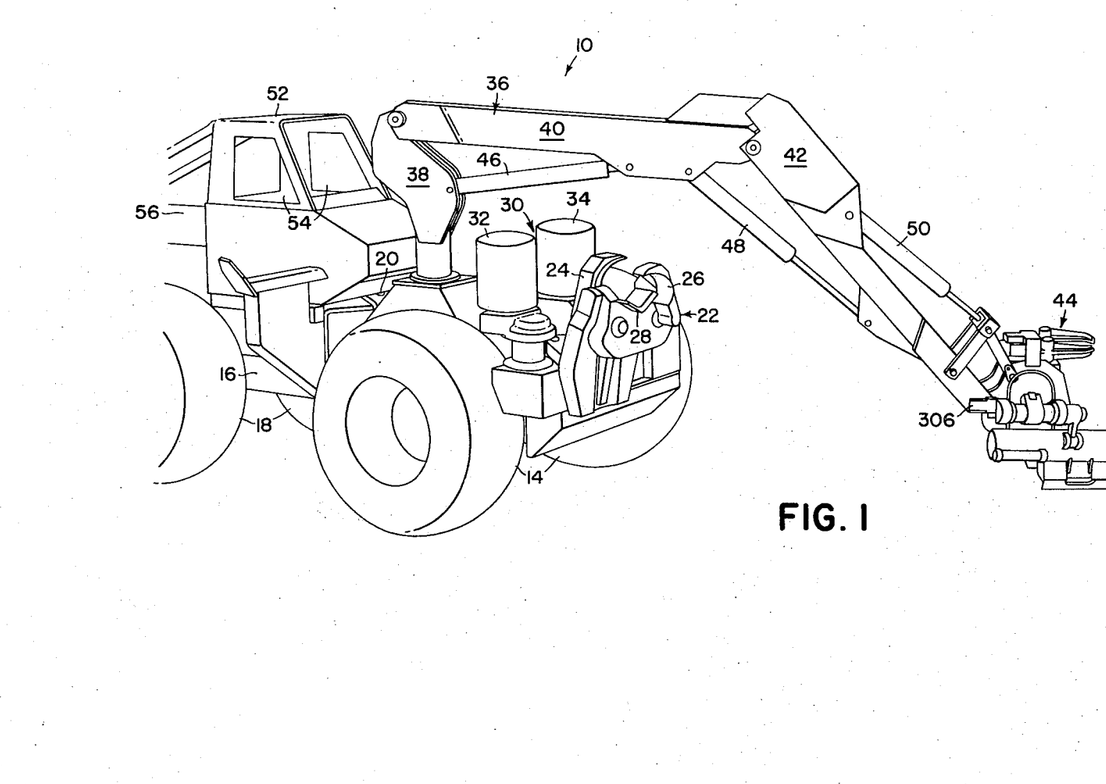
FIG. 1 is a perspective overall view of the tree harvesting machine embodying a felling head structure constructed according to the principles of the present invention.

Referring now to FIG. 1, therein is shown an articulated four-wheel drive vehicle comprising a front frame section 12 supported on a pair of front drive wheels 14 and a rear frame section supported on a pair of rear drive wheels 18, the front and rear frame sections being pivotally interconnected through means of a vertical pivot structure shown partially at 20. Mounted on the forward end of the front frame section 12 is a delimbing blade assembly 22 comprising a pair of opposed arcuate blades 24 and 26 mounted for pivotal movement towards and away from each other and a fixed V-shaped blade 28, the blades thus being operable for permitting a tree to be deposited onto the V-shaped blade 28 so as to be partially supported thereby when the blades 24 and 26 are spread apart and for encircling the supported tree trunk when the blades 24 and 26 are moved together. Mounted just rearwardly of the delimbing blade assembly 22 is a feed roll assembly 30 including a pair of feed rolls 32 and 34 mounted for movement towards and away from a tree trunk located therebetween and driven for engaging the tree trunk for propelling it through the delimbing blades. For the purpose of shearing a standing tree and introducing the same into the delimbing blade and feed roll assemblies 22 and 30, respectively, the vehicle 10 is provided with a felling boom assembly 36 which is supported on the front frame section at a central location between the opposite sides of the front frame section and just forwardly of the pivot structure 20. The felling boom assembly 36 comprises an upright support post 38 journaled in the front frame section 12 for movement about a vertical axis and controlled by hydromechanical means (not shown). The opposite ends of a first boom section 40 are respectively pivotally connected to the upper end of the upright support post 38 and to one end of a second boom section 42 by means defining respective horizontal pivot axes. The other end of the second boom section 42 is pivotally connected to a felling head structure 44 by means, to be further described below, defining a further horizontal axis. A trio of hydraulic actuators 46, 48 and 50 are respectively connected between the support post 38 and the first boom section 40, between the first and second boom sections 40 and 42 and between the second boom section and felling head structure 44, the actuators being selectively operable for placing the felling head structure 44 in a position for shearing a standing tree and for moving a just cut tree into a generally horizontal disposition for reception, when released, by the delimbing blade and feed roll assemblies 22 and 30. A cab 52 is positioned centrally between the opposite sides of and is mounted on the forward portion of the rear frame section 16 just rearwardly of the pivot structure 20. The cab 52 includes a plurality of windows 54 through which an operator may look to observe the operation of the various assemblies mounted on the front frame section. Located just rearwardly of the cab 52 is an engine housing 56 in which an internalcombustion engine (not shown) is located.

Figure 2:
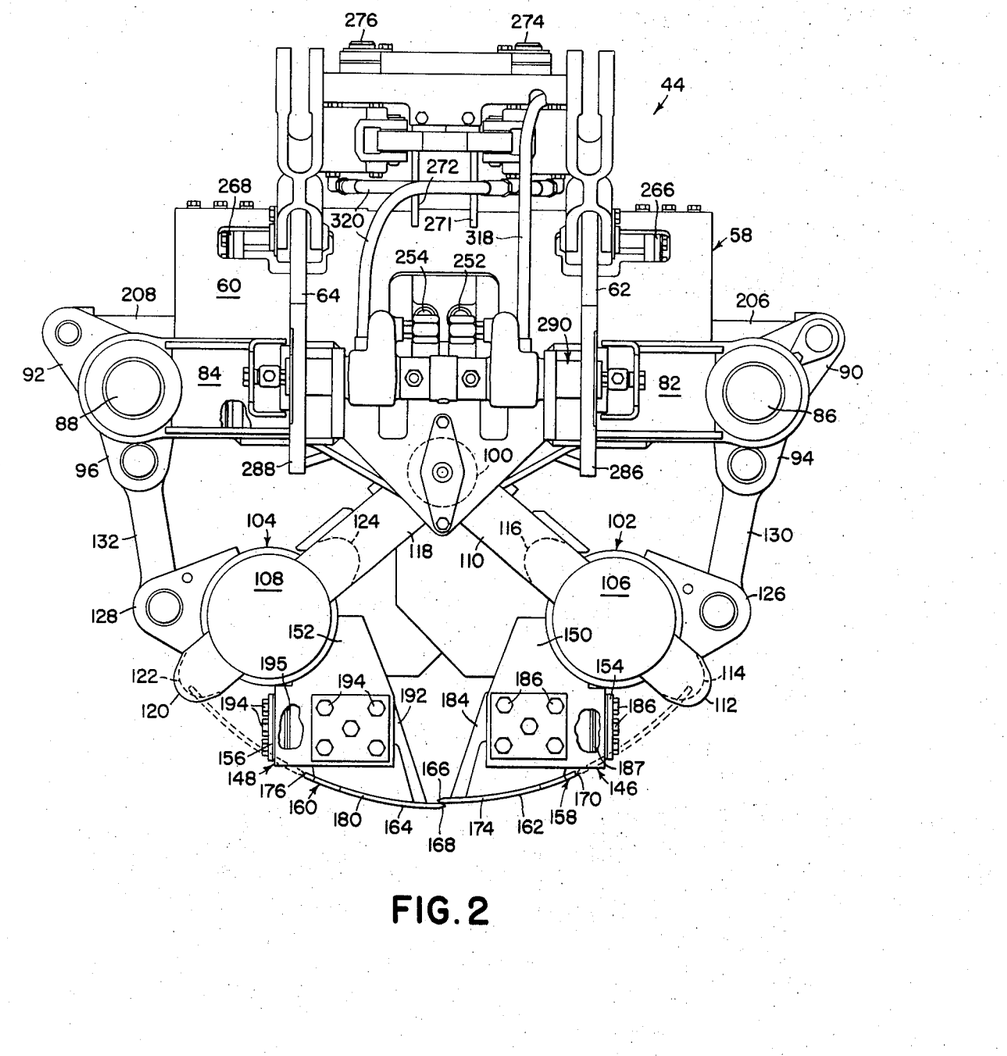
FIG. 2 is a rear elevational view of the felling head structure.
Figure 3:
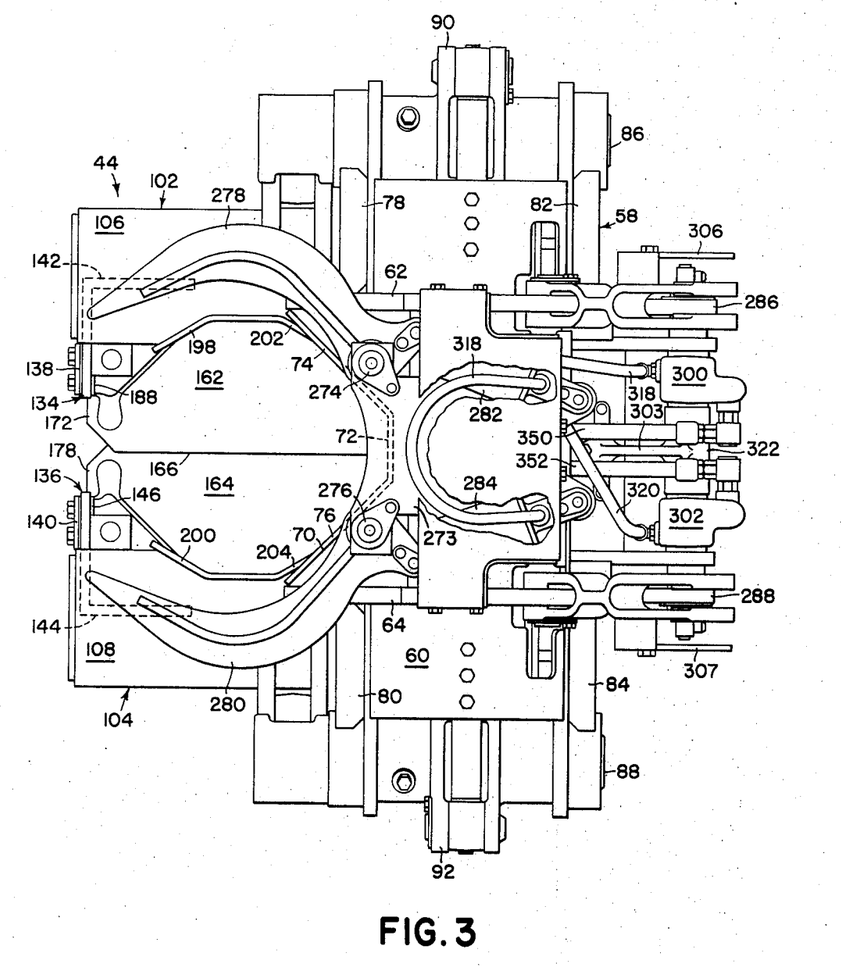
FIG. 3 is a top plan view of the felling head structure.
Figure 4:
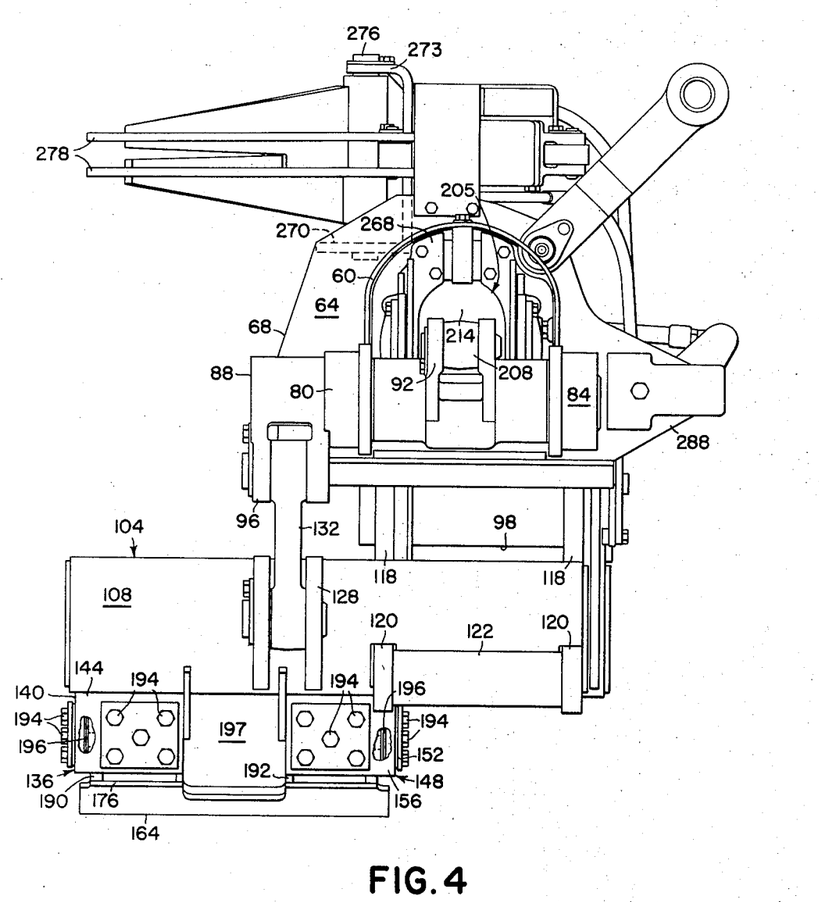
FIG. 4 is a side elevational view of the felling head structure.

As can best be seen in FIGS. 2-4, the felling head structure 44 includes a main frame 58 including a transversely extending inverted U-shaped member which defines an actuator housing 60. Spaced inwardly from the ends of and secured in surrounding relationship to the housing 60 are parallel, right- and left-hand flanges 62 and 64. The flanges 62 and 64 respectively have forward portions 66 and 68 between which a reinforcing member 70 is located, the reinforcing member being fixed integrally with the forward side of the housing 60 and the flanges 62 and 64 and including a forwardly facing vertical central surface 72 from which right and left vertical surfaces 74 and 76 diverge forwardly respectively to the forward edges of the flanges 62 and 64. The flanges 62 and 64 and the reinforcing member 70 thus form a forwardly opening receptacle for receiving the trunk of a standing tree about to be sheared. Fixed to the right and left surfaces of the flanges 62 and 64 and the housing 60 in general transverse alignment with the reinforcing member 70 are right and left front reinforcing bars 78 and 80 which extend beyond the opposite transverse ends of the housing 60. Right and left rear reinforcement bars 82 and 84 are similarly secured to the flanges 62 and 64 and the housing 60 at the rearward side of the housing. A right crankshaft 86 extends between and is rotatably mounted in the projecting ends of the right front and rear reinforcement bars 78 and 82 and a left crankshaft 88 is similarly mounted in the projecting ends of the left front and rear reinforcement bars 80 and 84. Thus, the axes of rotation of the crankshafts 86 and 88 are parallel to each other and are horizontal when the felling head structure 44 is in an upright or level position as illustrated. Respectively fixed to the right and left crankshafts 86 and 88 in centered relationship relative to the opposite ends of the housing 60 are upwardly projecting crank arms 90 and 92 and respectively fixed to the forward ends of the crankshafts 86 and 88 are downwardly projecting crank arms 94 and 96. The frame 58 includes a central lower portion 98 in which a pivot pin 100 is mounted. The pivot pin 100 is located equidistant from and extends parallel to the crankshafts 86 and 88 and provides a pivotal connection for right- and left-hand blade support arms 102 and 104, respectively. The blade support arms 102 and 104 respectively include cylindrical members 106 and 108 having respective closed ends and extending beneath and forwardly of the frame 58 in parallel relationship to the pivot pin 100. A right pair of parallel straps 110 extend diametrically through longitudinally spaced locations of the cylindrical member 106 beneath the frame 56 and have upper ends pivotally connected to the pivot pin 100 and have exposed lower ends 112 between which extend a bar 114 that is welded thereto and to the cylindrical member 106. A similar bar 116 is welded between the straps 110 at a location diametrically opposite the bar 114. Similarly, a left pair of straps 118 extend diametrically through the cylindrical member 108 beneath the frame 58 and have upper ends pivotally connected to the pivot pin 100 and have exposed lower ends 120 having a bar 122 extending therebetween and welded thereto and to the cylindrical member 108. A similar bar 124 extends between and is welded to the straps 118 and the cylindrical member 108 at a location diametrically opposite from the bar 122. Respectively fixed to the cylindrical members 106 and 108 at a location directly below the downwardly projecting crank arms 94 and 96 are a pair of attachment ears 126 and 128. A right drop or force-transmitting link 130 is pivotally interconnected between the crank arm 94 and the attachment ear 126 and a left drop or force-transmitting link 132 is pivotally interconnected between the crank arm 96 and the attachment ear 128. Respectively fixed to inner opposed portions of the cylindrical members 106 and 108 adjacent the forward ends thereof are right angular brackets 134 and 136 respectively having front sides 138 and 140 and outward sides 142 and 144, the front and outward sides being disposed so as to define opposed upright corner structures. Similarly mounted on the cylindrical members 106 and 108 respectively rearwardly of the brackets 134 and 136 are rear right angular brackets 146 and 148. The brackets 146 and 148 respectively include rear sides 150 and 152 and outward sides 154 and 156, the rear and outward sides cooperating to form respective opposed upright corner structures.

Connected to the right front and rear right-angular brackets 134 and 146 is a right shear blade structure 158 and connected to the left front and rear right-angular brackets 136 and 148 is a left shear blade structure 160. The blade structures 158 and 160 respectively include plate-like blades 162 and 164, which are cylindrically curved about the axis of the pivot pin 100. The blades 162 and 164 respectively include opposed leading cutting edges 166 and 168, which extend parallel to the axis of the pivot pin 100. Extending crosswise to the cutting edge 166 and a trailing edge 170 are front and rear edges 172 and 174 and extending crosswise to the cutting edge 168 and a trailing edge 176 are front and rear edges 178 and 180, respectively. Secured integrally to the upper concave surface of the right blade 162 at the respective corners formed by the intersection of the trailing edge 170 with the front and rear edges 172 and 174 are right front and rear upright corner brackets 182 and 184, which are respectively positioned within the right front and rear right-angular brackets 134 and 146 and secured thereto by a plurality of bolts 186. A plurality of shims 187 are respectively sandwiched between the respective front outward sides of the right front and rear brackets 134 and 146 and the corresponding sides of the right front and rear upright corner brackets 182 and 184. A plurality of shims 188 are respectively sandwiched between the front side of the bracket 134 and the corresponding side of the corner bracket 182 and between the rear side of the bracket 146 and the corresponding side of the corner bracket 184. Similarly, left front and rear upright corner brackets 190 and 192 are secured to the upper concave surface of the blade 164 respectively at the corners formed by the intersection of the trailing edge 172 of the blade with the front and rear edges 178 and 180. The depending brackets 136 and 148 are respectively connected to the brackets 190 and 192 through means of a plurality of bolts 194, it being noted that a plurality of shims 195 are positioned between opposed outer sides of the connected brackets and a plurality of shims 196 are positioned between respective opposed front and rear sides of the connected brackets.

As can best be seen in FIG. 4, an opening 197 is bounded by the lower side of the cylindrical member 108, the rear edge 176 of the blade 164, and opposed edges of the left front and rear depending brackets 136 and 148. The opening 197 and an opening (not shown) similarly bounded by the cylindrical member 106, the blade 164 and the brackets 134 and 146 at the opposite side of the felling head structure serve as passages through which debris such as twigs, mud and snow, or the like, may pass when the blades 162 and 164 are closed to sever the trunk of a tree.

As can best be seen in FIG. 2, the cutting edges 166 and 168 of the blades are overlapped when the blades are closed. This overlap may be adjusted by removing or adding one or more of the shims 187 and 195. Further, the right front and rear corner brackets 182 and 184 and the left front and rear corner brackets 190 and 192 are located such that their respective front and rear sides are spaced a predetermined distance from the front and rear sides respectively on the right front and rear brackets 134 and 146 and the left front and rear brackets 136 and 148 before the bolts 186 and 194 are tightened. Thus, the blades 162 and 164 are pre-stressed in a direction parallel to their cutting edges 166 and 168 when the bolts 186 and 194 are tightened. It will be appreciated then that the amount of prestressing may be adjusted by removing or adding one or more of the shims 188 and 196 as desired.

For the purpose of gripping a tree trunk once the blade structures are closed, there are provided opposed upright, right and left three-sided gripper plates 198 and 200 respectively integrally mounted in the opposed inner sides of the cylindrical members 106 and 108. As can best be seen in FIG. 3, the plates 198 and 200 respectively have rearward surfaces 202 and 204 which are in substantial vertical alignment with the right and left surfaces 74 and 76 of the reinforcing member 70.

Figure 6:
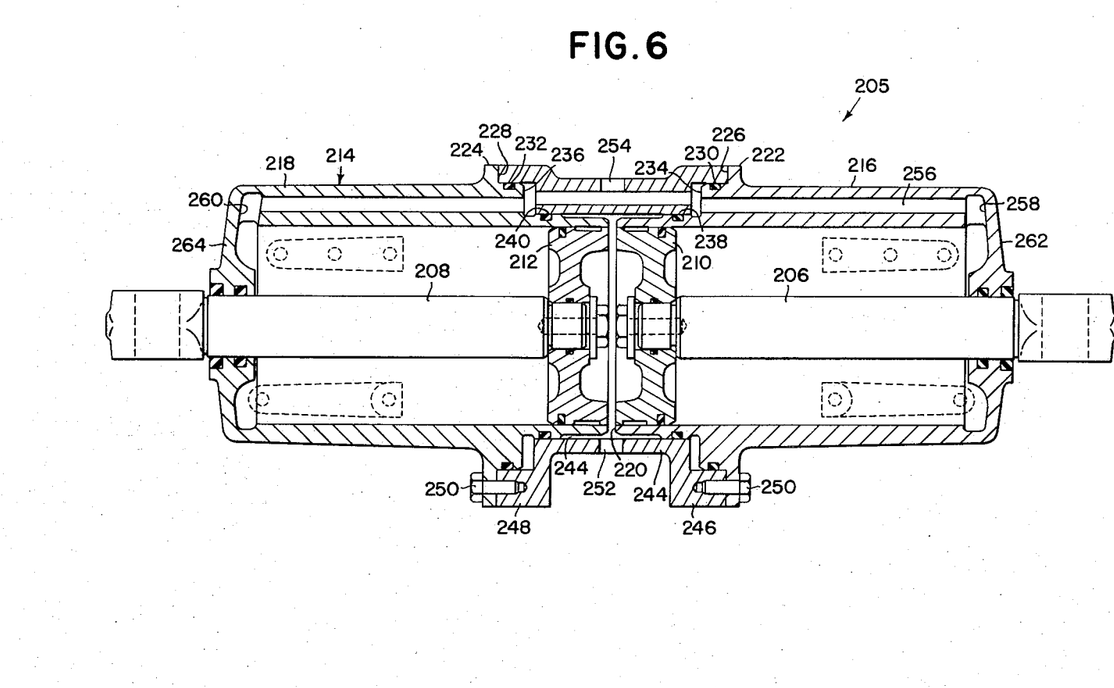
FIG. 6 is a longitudinal sectional view of the actuator for operating the shear blades with the actuator work ports shown displaced from their true positions for convenience.

An extensible and retractable hydraulic actuator 206 is located in the actuator housing 60 and includes right and left piston rods 206 and 208 having their outer ends pivotally connected to the upwardly projecting crank arms 90 and 92 respectively of the crankshafts 86 and 88. Right and left pistons 210 and 212 are respectively connected to the inner ends of the piston rods 206 and 208 and are reciprocably mounted in a cylinder 214. The cylinder 214 comprises right and left end sections 216 and 218 having opposed open ends spaced apart as at 220. Respectively spaced axially from the inner ends of the cylinder sections 216 and 218 are annular flanges 222 and 224 including opposed axially facing surfaces 226 and 228, respectively. Extending axially towards the inner ends of the cylinder sections 216 and 218 from the flanges 222 and 224 are first outwardly facing annular mounting surfaces 230 and 232 which terminate axially inwardly at respective opposed annular axially facing surfaces 234 and 236, the latter surfaces respectively terminating radially inwardly at second outwardly facing annular surfaces 238 and 240. A collar-like center cylinder section 242 is located between the flanges 222 and 224 of the cylinder sections 216 and 218 and includes an inner surface 244 which is seatingly engaged with the mounting surfaces 238 and 240, and further includes right and left flanges 246 and 248 respectively seatingly engaged on the mounting surfaces 230 and 232 and secured in abutting engagement with the flanges 222 and 224 through means of a plurality of screws 250.

It is here noted that the retraction strokes of the pistons 210 and 212 are respectively chosen to end at the inner ends of the cylinder sections 216 and 218 so that the pistons are always spaced axially from one another. A first work port 252 extends through the wall of the center cylinder section 242 into fluid communication with the space between the pistons 210 and 212. A second work port 254 extends through the center cylinder section 242 into fluid communication with an axial fluid passage 256 formed of respective axial sections located in the walls of the three cylinder sections 216, 218 and 242. The opposite ends of the fluid passage 256 open into right and left annular recesses 258 and 260 respectively formed in right and left closed ends 262 and 264 of the cylinder sections 216 and 218. Thus, it will be appreciated that the piston rods 206 and 208 are double-acting as they can be selectively retracted and extended by connecting the work ports 252 and 254 alternately to a source of fluid pressure and a reservoir. Accordingly, the right and left blade structures 158 and 162 may be swung towards the closed position shown in FIG. 2 by extending the piston rods 206 and 208, and the blade structures 158 and 160 can be swung to an open position, wherein the blades 162 and 164 are spaced apart, by retracting the piston rods 206 and 208. So as to prevent the cylinder 214 from shifting endwise during extension or retraction of the piston rods 206 and 208, right and left stop or guide structures 266 and 268 are respectively fixed in the housing 60 in engagement with the opposite ends of the cylinders 214.

A grapple support structure comprises an integral part of the frame 58 and includes a horizontal member 270 spaced vertically above the reinforcing member 70 and having its opposite ends fixed to the flanges 62 and 64 and having a rearward edge fixed to the top front portion of the housing 60. Fixed to the horizontal member 270 at locations spaced inwardly from the right and left ends thereof are right and left vertical plates 271 and 272 and secured to the tops of the vertical plates is a second horizontal member 273. Right and left vertical pivot pins 274 and 276 respectively extend between and are rotatably mounted in the horizontal members 270 and 273 and provide pivot connections for right- and left-hand grapple tongs 278 and 280 respectively. A pair of extensible and retractable hydraulic actuators 282 and 284 are respectively pivotally interconnected between the frame 58 and the grapple tongs 278 and 280.

Figure 5:
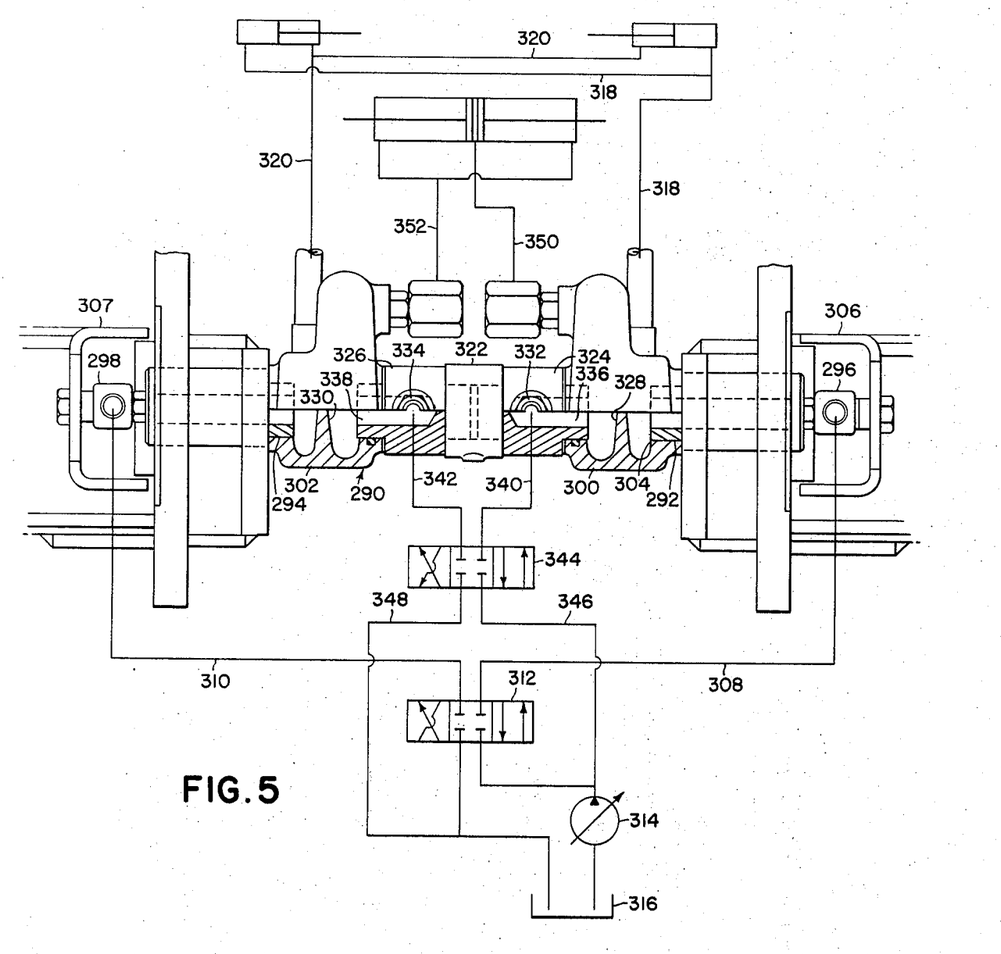
FIG. 5 is a partially schematic and sectional view showing the pivotal connection between the felling head structure and one end of a felling boom section.

The frame flanges 62 and 64 project rearwardly at the rearward side of the frame 58 and form respective mounting ears 286 and 288 in which the opposite ends of a horizontally disposed combined pivot pin and fluid manifold structure 290 is pivotally mounted, the structure 290 serving to pivotally connect the felling head structure 44 to the outer end of the second boom section 42. The right and left ends of the structure 290 respectively comprise tubular pins 292 and 294 having respective outer ends to which right and left fittings 296 and 298 are mounted and having respective reduced-in-diameter inner ends mounted in right and left manifolds 300 and 302 in fluid communication with first manifold chambers 304 and 305. Guard plates 306 and 307 respectively extend around the fittings 296 and 298. A pair of hydraulic conduits or hoses, here represented by the lines 308 and 310 in FIG. 5, are mounted on the second boom section 42 and have their ends connected to the right and left fittings 296 and 298. Connected to the lines 308 and 310 and to a pump 314 and a reservoir 316 is a valve 312 for controlling the flow of fluid to and from the lines 308 and 310. A second pair of hydraulic fluid lines 318 and 320 are respectively connected to the first chambers 304 and 306 of the right and left manifolds and are respectively connected to the head and rod ends of the grapple tong actuators 282 and 284. A central, tubular member 322 is located between the manifolds 300 and 302 and is fixed to the felling head frame 44 through means of an integral arm 303, as can best be seen in FIG. 3. Right and left pins 324 and 326 have their respective inner ends rotatably mounted in the member 22 and have their respective outer ends mounted in the manifolds 300 and 302 in fluid communication with respective second chambers 328 and 330. Right and left fittings 332 and 334 are respectively mounted on the right and left pins 324 and 326 and respectively communicate with radial passages which are in turn in fluid communication with respective axially drilled bores 336 and 338 opening into the chambers 328 and 330. A pair of fluid conduits or lines 340 and 342 are respectively connected to the fittings 332 and 334 and are connected to a control valve 344, the control valve in turn being connected to the pump 314 and the reservoir 316 through means of respective lines 346 and 348. The second chambers 328 and 330 of the right and left manifolds 300 and 302, respectively, are respectively connected to the work ports 252 and 254 of the hydraulic actuator 205 for operating the blades through means of fluid lines or conduits 350 and 352. As can best be seen in FIG. 4, the work ports of the hydraulic actuator 205 are located approximately in direct forward alignment with the connections of the lines 350 and 352 with the manifolds 300 and 302 thus making it possible for the lines 350 and 352 to be relatively short in length.

The operation of the felling structure 44 is as follows. Assuming that the vehicle 10 is in an area whereat it is desired to harvest trees, and it is desired to shear an adjacent tree, the tree shear operating actuator 205 will be retracted to position the cutting blades 162 and 164 in their open spaced apart position shown in dashed lines in FIG. 2. The grapple tong actuators 282 and 284 will likewise be retracted to position the grapple tongs 278 and 280 in their open spaced apart position shown in solid lines in FIG. 3. A tree-receiving zone thus extends vertically between the right and left shear blades 162 and 164 and the right and left grapple tongs 278 and 280. The various actuators 46, 48 and 50 of the felling boom assembly 36 are respectively actuated to position the felling head structure so as to engage the central surface 72 of the reinforcing members 70 with the trunk of the selected tree. The tree trunk will now extend vertically between the cutting blades and grapple tongs of the felling head structure. The control valve 312 is then shifted leftwardly from its neutral position shown in FIG. 5 to connect the pump 314 and reservoir 316 to the grapple tong actuators 282 and 284 so as to cause the latter to extend and close the grapple tongs 278 and 280 upon the trunk of the tree. The control valve 344 is then shifted leftwardly from its neutral position shown in FIG. 5 to pressurize the space between the pistons 210 and 212 to cause the piston rods 206 and 208 to extend and rotate the crankshafts 86 and 88 to cause the blades to be moved towards their closed position shown in solid lines in FIG. 2. It is to be noted that the right and left linkages defined by the right and left crankshafts 86 and 88, the right and left drop links 130 and 132 and the right and left blade support arms 102 and 104 are respectively arranged such that the mechanical advantage of the linkage is relatively small when the cutting edges 166 and 168 of the blades 162 and 164 first begin to bite into the opposite sides of the tree and increases as the blades travel through the tree to the center thereof. Once the tree has been sheared, the blades 162 and 164 will act in conjunction with the grapple tongs 278 and 280 to support a tree and in the case of relatively large trees, the right and left three-sided gripper plates 198 and 200 will also assist in the support of a cut tree.

It is to be noted that the above procedure is also suitable for shearing a tree which has its base located beneath snow since when the blades 162 and 164 are in their open position, the curvature of the blades 162 and 164 acts somewhat like a plow to separate the snow and permit the felling head structure 44 to be positioned at the base of the tree. As the blades 162 and 164 move together in snow or trash or the like, the trunk of the tree being cut will act to push the snow through the opening 197 and the corresponding opening at the opposite side of the felling head structure. Any mud or snow or the like left on the top surfaces of the blades after a tree has been sheared will slide off after the blades are opened again.

In order to increase the wear life of the curved blades 162 and 164, they are preloaded during their connection to the right and left blade support arms 102 and 104. Specifically, a sufficient number of the shims 188 and 196 are placed between the respective right-angular brackets of the blade support arms and the respective corner brackets of the blade structures so as to snugly dispose the blade structures between the right-angular brackets. One shim, for example, is then removed from each group of shims assembled and the bolts 186 and 194 at the front and rear sides of the right-angular brackets are tightened so as to stress the respective blades 162 and 164 in a direction parallel with their cutting edges 166 and 168.

The desired degree of overlap of the cylindrical blades 162 and 164 is also effected during the connection of the right and left blade structures 158 and 160 to the right and left blade support arms 102 and 104. Specifically, the space between the outward sides of the respective right-angular brackets 134, 136, 146 and 148 and the respective corner brackets 182, 184, 190 and 192 are shimmed so that the blades 162 and 164 overlap each other approximately the length of the beveled cutting edges 166 and 168.

It is to be noted that the combined pivot pin and fluid manifold structure 290 permits the fluid lines 308, 310, 350 and 352 to remain in fixed positions irregardless of the pivoted position of the felling head structure 44 relative to the second felling boom section 47. Also, it is to be noted that since the work ports in the blade-operating actuator 205 are located centrally side by side in the central cylinder section 242 in substantial fore-and-aft alignment with the respective connections of the lines 350 and 352 with the right and left manifolds 300 and 302, the lines 350 and 352 are relatively short.

We claim:

1. A tree shear comprising: a frame having a forward side and a bottom; a pair of blade support arms being pivotally connected to the frame adjacent the bottom thereof for swinging about an axis extending generally perpendicular to said forward side; said pair of arms respectively including a pair of support members extending forwardly beyond said main frame in general parallelism to said axis; a pair of plate-like cutting blades respectively being fixed to said pair of blade support arms, and having opposed cutting edges extending substantially parallel to said axis; said pair of blades, as viewed in a direction parallel to said axis, being arcuately curved about said axis; a pair of crankshafts being rotatably mounted in said main frame for movement about respective axes extending parallel to and being equally spaced from the opposite sides of said axis; motor means being drivingly connected to said crankshafts for selectively rotating the latter and a pair of drive links having first ends respectively pivotally connected to said pair of crankshafts and having second ends respectively pivotally connected to said pair of blade support arms.

2. The tree shear defined in claim 1 wherein said pair of support members respectively comprise a pair of tubular members having opposite closed ends; said blade support arms each including a pair of spaced, parallel strap-like members passing crosswise through a respective tubular member and having respective protruding ends; each pair of strap-like members being fixed to the tubular member through which they pass by first reinforcement members fixed to one side of the tubular member and to the protruding ends of the strap-like members and by second reinforcement members fixed to an opposite side of the tubular member and to the strap-like members; and said strap-like members being pivotally connected to the frame for movement about said axis.

3. The tree shear defined in claim 1 wherein said pair of support members respectively comprise a pair of tubular members having opposite closed ends; and a pair of opposed tree-receiving receptacles being respectively fixed integrally with opposed inner portions of said tubular members above said cutting blades and being arranged to clamp a tree after the latter has been sheared by said cutting blades.

4. The tree shear defined in claim 2 wherein said tubular members are cylindrical.

5. The tree shear defined in claim 3 wherein said tubular members are cylindrical.

6. A tree shear comprising: a main frame having a front side portion which defines an upright surface disposed for contacting a standing tree when the latter is being sheared; a pair of blade supporting arms comprising a first pair of members being respectively pivotally connected at one of their ends to the main frame for swinging towards and away from each other about an axis extending substantially perpendicular to said upright surface and a second pair of members being respectively rigidly joined to said first pair of members and extending substantially parallel to said axis beneath and forwardly of said main frame; a pair of blade structures each including a plate-like cutting blade curved arcuately between cutting and trailing edges and having forward and rearward edges joining said cutting and trailing edges; each blade structure further including upright member means secured to said cutting blade adjacent its trailing, forward and rearward edges and defining forward and rearward upright corner structures respectively adjacent the intersections of the forward and rearward edges with said trailing edge; said second pair of members of said blade supporting arms each including a pair of depending mounting brackets having angular portions shaped complementary to and received in the upright corner structures of one of said pair of blade structures; releasable fastener means securing said upright corner structures and said depending mounting brackets together; said cutting edges of said blades extending generally parallel to said axis; said blades being curved such that they lie along the path swept by said cutting edges as they move about said axis between an open spaced-apart position defining a tree-receiving zone and a closed position wherein the edges are adjacent the center of said zone; and power means connected to said blade supporting arms for selectively effecting movement of the cutting edges between said open and closed positions.

7. The tree shear defined in claim 6 wherein each of the forward and rearward corner structures of each blade structure includes first and second sides respectively extending generally parallel and perpendicular to the cutting edge of the blade structure of which the corner structures form a part; and said first sides having opposed inner edges which are spaced apart to define an opening for permitting the passage of material.

8. A tree shear comprising: a support frame defining an elongate, horizontally extending, open-ended, tubular housing; a pair of crankshafts being respectively rotatably mounted to said frame at opposite ends of said housing for rotation about a pair of parallel horizontal axes extending crosswise to the length of said housing; a first extensible and retractable motor means being located in said housing and being connected to said pair of crankshafts for effecting simultaneous rotation thereof; a tree-engaging surface means being located on the exterior of said housing between said parallel axes for engaging a tree stem extending crosswise to said parallel axes and crosswise to the length of said housing; said pair of crankshafts each extending from said frame beyond said tree-engaging surface means; a pair of blade structures rotatably mounted to said support frame for rotation about a third axis located equidistant from and extending parallel to said pair of parallel axes; said pair of blade structures extending from said frame beyond said tree-engaging surface means and respectively including cutting edges elongated in a direction substantially parallel to said third axis and arranged so as to be movable with the respective blade structures about said third axis between an open position wherein they are spaced apart a distance greater than the diameter of a tree stem to be sheared, and a closed position wherein they are closely adjacent each other; and a pair of link means respectively connecting said pair of crankshafts to said blade structures for effecting the movement of said cutting edges between said open and closed positions upon selective actuation of said extensible and retractable motor means.

9. The tree shear defined in claim 8 wherein each of said blade structures includes a plate-like blade curved on a radius about said third axis; and said cutting edge of each blade structure forming one edge of each blade.

10. The tree shear defined in claim 8 wherein said first extensible and retractable motor means comprises a unitary cylinder loosely received in said housing and having a pair of pistons slidably mounted therein; and a pair of piston rods respectively having first ends connected to said pair of pistons and second ends connected to said pair of crankshafts, said motor means thus being supported solely by said pair of crankshafts.

11. The tree shear defined in claim 10 wherein said motor means and said housing have cooperating abutment means for preventing said cylinder from undergoing shifting movement along the length of the housing during extension and retraction of the motor means.

12. The tree shear defined in claim 8 wherein said pair of blade structures are pivotally connected to said frame at a location which is directly beneath said housing and forms a lowermost part of said frame when the latter is disposed such that said pair of parallel axes lie in a common horizontal plane; a pair of grapple tongs being rotatably mounted on said frame for swinging towards and away from each other about a second pair of parallel axes which extend perpendicular to said first-mentioned parallel axes; said grapple tongs being mounted to said frame at locations respectively equidistant from the opposite ends of said housing and on that side of the housing which is opposite from the side whereat said blade structures are pivoted; and a second extensible and retractable motor means being connected between said main frame and said grapple tongs for selectively swinging the latter towards and away from each other.

13. The tree shear defined in claim 10 wherein said first extensible and retractable motor means comprises a first pair of double-acting hydraulic actuators; a pair of grapple tongs being rotatably mounted on said support frame for swinging towards and away from each other respectively about a second pair of parallel axes which are located equidistant from and extend in a direction perpendicular to said third axis; and a second pair of double-acting hydraulic actuators being respectively connected between said support frame and said pair of grapple tongs; combined horizontal pivot pin and manifold means being mounted on said support frame rearwardly of said housing and including surface means, adapted for establishing a horizontal pivot connection between one end of a boom structure and the support frame, and including fluid passage means connected to said first and second pairs of double-acting hydrauluc actuators for conveying pressure and exhaust fluid to and from said first and second pairs of hydraulic actuators.

14. A tree shear comprising: a main frame having a front side portion defining a surface adapted for engagement with a side of a standing tree trunk when the latter is being sheared; a pair of blade support arms being pivotally connected to said main frame for swinging movement toward and away from each other about an axis extending crosswise to said surface; said blade support arms including forwardly extending portions extending beyond the front side portion of said main frame and being adapted to be positioned on opposite sides of a tree trunk engaged by said surface; a pair of cutting blade structures; connection means respectively releasably securing said cutting blade structures to said pair of blade support arms for movement with the arms to shear a tree trunk positioned therebetween; said pair of blade structures respectively including a pair of cylindrically curved, plate-like blades respectively having a pair of cutting edges extending parallel to said axis and respectively terminating at front and rear pairs of edges extending crosswise to said pair of cutting edges; and said connection means including first adjustable means for prestressing said blades in a direction parallel to said cutting edges.

15. The tree shear defined in claim 14 wherein said pair of cutting blade structures each include a pair of upright brackets secured to the top surface of the blade adjacent said front and rear edges and each upright bracket including a side extending substantially perpendicular to said cutting edge; said forwardly extending portions of said blade support arms each including a pair of spaced depending brackets having said upright brackets of a respective blade structure located therebetween and respectively having sides positioned in closely spaced facing relationship to said sides of said upright brackets of a respective blade when the blade is in an unstressed condition; and threaded fastener means extending through said opposed sides of said upright and depending brackets and being tightened to prestress said blades.

16. The tree shear defined in claim 15 and further including shim means sandwiched between said opposed sides of said upright and depending brackets for limiting the amount that the blades can be prestressed.

17. The tree shear defined in claim 14 wherein said plate-like blades are disposed so as to overlap when the blades are in a closed position; and said connection means including a second adjustable means for adjusting the amount that said blades will overlap when closed.

18. The tree shear defined in claim 14 wherein the cutting edges of the blades are arranged so as to occupy predetermined desired positions relative to each other when the blades are closed; and said connection means including a second adjustable means for adjusting said blades so as to dispose the same in said desired positions.

* * * * *